Nov. 15, 1966 R. S. NAROZNY ET AL 3,286,223
FERRULE CONSTRUCTION AND A METHOD FOR PRODUCING SAME
Filed May 18, 1964 2 Sheets-Sheet 1
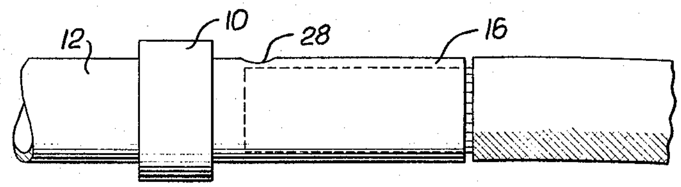
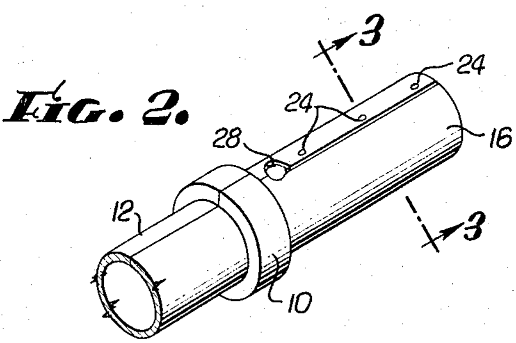
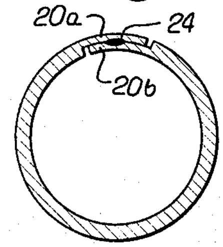
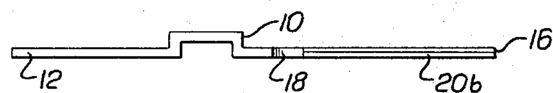
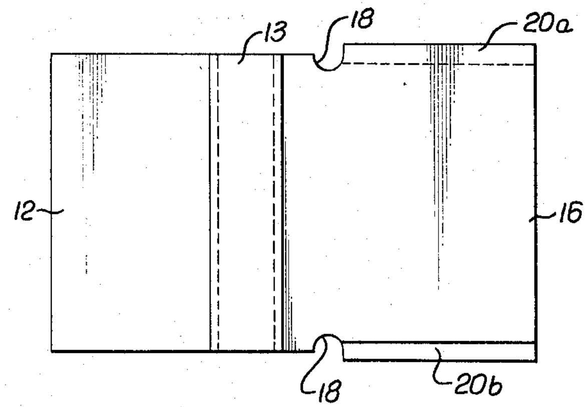
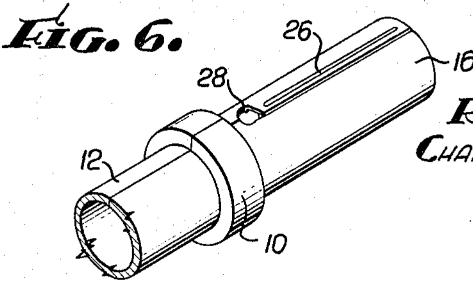
RONALD S. NAROZNY
CHARLES C. ANDERSON
INVENTORS.
BY Huebner & Worrel
ATTORNEYS.

FERRULE CONSTRUCTION AND A METHOD FOR PRODUCING SAME
Filed May 18, 1964 2 Sheets-Sheet 2
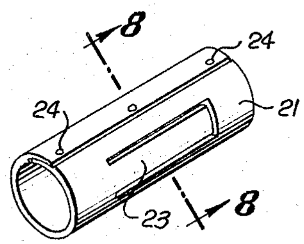
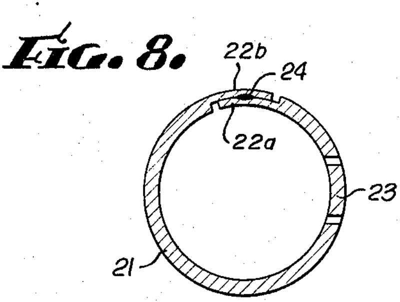
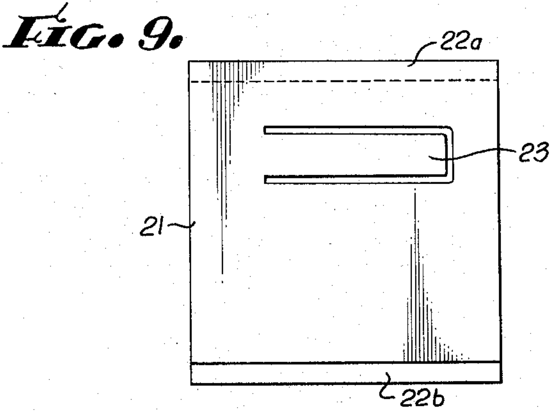
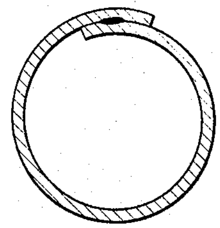
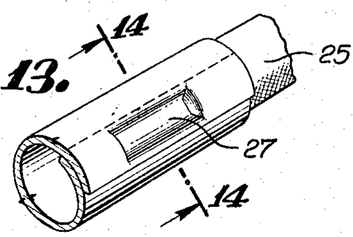
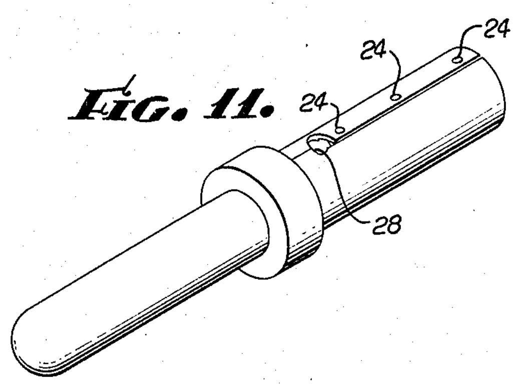
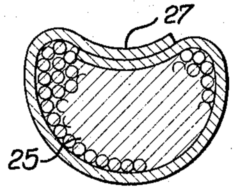
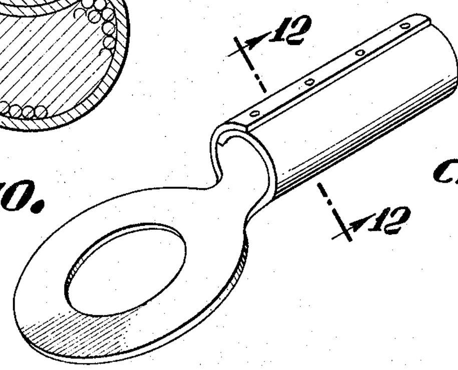
RONALD S. NAROZNY
CHARLES C. ANDERSON
INVENTOR.
BY Huebner & Worrel
ATTORNEYS.

United States Patent Office 3,286,223

Patented Nov. 15, 1966

3,286,223

FERRULE CONSTRUCTION AND A METHOD FOR PRODUCING SAME

Ronald S. Narozny, Panorama City, and Charles C. Anderson, Costa Mesa, Calif., assignors, by mesne assignments, to International Telephone and Telegraph Corporation, New York, N.Y., a corporation of Maryland Filed May 18, 1964, Ser. No. 368,200
2 Claims. (Cl. 339—276)

The invention relates to a cylindrical ferrule suitable for use as a solder pot or crimping sleeve of an electrical connector terminal member, or for use as a contact retention clip, and to the method of producing such a ferrule by stamping and forming the same from sheet metal. The uses indicated are by way of example and not of limitation.

The customary production of ferrules of the general character identified includes machining and drilling of solid stock, a relatively expensive and somewhat wasteful method. The broad object of the present invention is to produce such ferrules more cheaply and with less waste.

The invention comprises in general cutting of a sheet metal blank, stamping the same concurrently with the cutting or by a separate operation to provide any special profile intended, preferably, although not necessarily for all purposes, to coin or roll opposite edge portions to approximately half the thickness of the remainder of the blank, then to form the blank into a tube with the opposite edge portions overlapping, and finally to weld the lap area by any common resistance welding method, such as spot, series, parallel or seam. The resulting ferrule may constitute the finished article, or it may have embodied with it an electrical contact element or other accessory feature.

An object is to provide a ferrule formed of sheet metal which has sufficient strength along the tube seam so that it is crimpable by any standard crimping tools or systems without the need of orientation, that is to say, without reference to the peripheral location of the juncture in respect to the crimped area.

The foregoing, and other objects and advantages of the invention will be readily apparent from a consideration of the following description when taken in conjunction with the drawings in which:

FIGURE 1 is a side elevation of a ferrule embodying the invention with an electrical conductor crimped in the ferrule.

FIGURE 2 is a perspective view of the ferrule of FIGURE 1 showing the overlapping edges of the ferrule secured together by means of spot welds.

FIGURE 3 is a sectional view of the ferrule looking in the direction of the arrows along line 3—3 of FIGURE 2.

FIGURE 4 is a side view showing a metal stamping prior to its being rolled into the ferrule construction of this invention.

FIGURE 5 is a top view of the metal stamping shown in FIGURE 4.

FIGURE 6 is a perspective view of the ferrule construction of this invention showing the overlapping edges of the ferrule secured together by means of a seam weld.

FIGURE 7 is a perspective view of the ferrule of this invention in the form of a retention clip.

FIGURE 8 is a sectional view taken along line 8—8 in FIGURE 7.

FIGURE 9 is a top view of a metal stamping prior to its being rolled, overlapped and welded to form the retention clip shown in FIGURE 7.

FIGURE 10 is a perspective view of one form of electrical terminal embodying the ferrule construction of this invention.

FIGURE 11 is a perspective view of the ferrule of FIGURE 10 shown as the rearward end of an electrical pin contact.

FIGURE 12 is a sectional view similar to FIGURE 8 with the overlapped edges each having the same thickness as the remainder of the ferrule wall. This may be employed where the inside and outside diameters are not critical.

FIGURE 13 is a perspective view of a ferrule utilized for electrical termination wherein a crimp secures the overlapped edge sections together.

FIGURE 14 is a cross-section taken on the line 14—14 of FIGURE 13.

Referring to FIGURES 4 and 5 wherein a metal stamping is shown prior to its being rolled into a tubular member and overlapped to form the ferrule construction of this invention, it is seen that the metal stamping, generally designated by the numeral 10, includes a forward portion 12, a raised center portion 13 and a rearward portion 16. The rearward portion 16 is provided with cutouts 18. The outer edge sections **20*a* and 20*b*** of the rearward portion are shaped or coined so as to reduce their thickness by approximately one-half the thickness of the metal stamping. Coining of the edge portions results in a wider section rearwardly of the cutouts and a narrower section forwardly thereof. Thus, the rearward edge portions can overlap and the forward edges can abut when the stamping is rolled.

Referring to FIGURE 9, there is shown a metal stamping 21 somewhat similar to the one shown in FIGURE 5, intended for forming an electrical contact retention clip such as shown in FIGURES 7 and 8. As in the form of FIGURE 5, the edge sections **22*a* and 22*b* of the metal stamping 21 are coined or shaped so as to reduce their thickness by approximately one-half the thickness of the metal stamping. For the retention clip, a tongue 23** is cut intermediate the ends.

To form the ferrule, the metal stamping 10 or 21 is rolled into a tubular configuration and a lap is made with the edges **20*a*, 20*b*, as shown in FIGURE 3, or with the edges 22*a*, 22*b*, as shown in FIGURE 8. After the metal stamping is rolled into the tubular configuration, the overlapped sections are secured together by any one of several alternative methods, such as by spot welds shown in FIGURE 2 at points 24, or a seam weld shown in FIGURE 6 designated by the numeral 26. It is also possible to roll the stamping into a tube over a wire conductor 25 and form a crimp 27** which performs the function of joining the overlapped edge sections and at the same time effecting the termination of conductor in the ferrule. See FIGURES 13 and 14.

If a blank such as shown in FIGURE 4 is used which has the cutouts 18, the ferrule possesses an inspection hole 28 at the forward end of the lapped portion through which the operator may peer to make sure that the conductor is properly inserted in the ferrule.

By providing for an overlapping half thickness edge construction, such as shown in the drawings and described hereinabove, a ferrule of uniform wall thickness and consequent inside and outside diameters can be provided where such is desired or is critical. The overlapping of full thickness edge sections can be used where the thickness or diameter has sufficient latitude in the design or use. Either form can be crimped over any part of the circumferential area when the overlap is welded. An alternative, as mentioned above, is to feed rolled strips into an automatic crimping machine, which performs the lap and crimps the ferrule to the wire conductor and then severs that portion forming the ferrule from a strip of the rolled material. In this type of operation at least one crimp indentation is provided in the lap and this crimp indentation serves to lock the edges of the ferrule firmly together.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices and methods.

What we claim as new and desire to secure by Letters Patent is:

1. An electrical terminal comprising: a ferrule fabricated of a sheet of rollable metal formed into a tube with opposite edge portions of one end section of the sheet overlapping and secured together, said overlapping portions having a total wall thickness approximately equal to the wall thickness of the remaining portion of the tube, opposite edge portions of the other end section of the sheet abutting each other, and edge cutouts dividing said sections and cooperatively providing an inspection port in the completed ferrule, an electrical conductor entering and terminating in the overlapped section of the tube and secured therein, and contact means extending from the end of the tube opposite the entry of the conductor.

2. A method of fabricating an electrical connector comprising the steps of: taking a sheet of rollable metal, stamping two cutouts in opposite edges of said sheet, coining opposite parallel edge portions positioned between said cutouts and another end of said sheet into complementary parallel areas approximately half the thickness of the remainder of the sheet, rolling the sheet into a tubular form with the edge portions overlapping and forming an inspection port with said cutouts, firmly securing the edge portions together, inserting an electrical conductor into said overlapping portions of said form, and crimping the exterior of said form without orienting the form to secure said conductor in said form.

References Cited by the Examiner

UNITED STATES PATENTS

| | | | |
|---|---|---|---|
| 755,436 | 3/1904 | Bentel | 29—477 X |
| 1,482,888 | 2/1924 | Converse. | |
| 2,318,647 | 5/1943 | White. | |
| 2,475,566 | 7/1949 | Karmazin | 29—477 X |
| 2,706,328 | 4/1955 | Karmazin | 29—477 |
| 2,763,849 | 9/1956 | Betts | 339—276 |
| 2,789,279 | 4/1957 | Gebel | 339—276 |
| 2,794,964 | 6/1957 | Hoffman | 339—276 |
| 3,031,638 | 4/1962 | Bertram et al. | 339—217 |
| 3,187,298 | 6/1965 | Shannon | 339—258 |
| 3,189,868 | 6/1965 | Hatfield | 339—258 X |

FOREIGN PATENTS

| | | |
|---|---|---|
| 15,374 | 11/1890 | Great Britain. |
| 675,923 | 7/1952 | Great Britain. |

EDWARD C. ALLEN, *Primary Examiner.*

P. TEITELBAUM, *Assistant Examiner.*